United States Patent [19]

Nuckels et al.

[11] 4,426,303

[45] Jan. 17, 1984

[54] SURFACTANT COMPOSITIONS USEFUL IN ENHANCED OIL RECOVERY PROCESSES

[75] Inventors: Nancy J. Nuckels, Carrollton, Tex.; James L. Thompson, Tulsa, Okla.

[73] Assignee: The Dow Chemical Company, Midland, Mich.

[21] Appl. No.: 267,177

[22] Filed: May 26, 1981

Related U.S. Application Data

[63] Continuation-in-part of Ser. No. 99,264, Dec. 3, 1979, abandoned.

[51] Int. Cl.$^3$ ............................................. E21B 43/22
[52] U.S. Cl. ................................ 252/8.55 D; 166/275
[58] Field of Search ................ 252/8.55 D; 166/273, 166/274, 275

[56] References Cited

U.S. PATENT DOCUMENTS

| 3,811,505 | 5/1974 | Flournoy et al. | 166/274 |
| 3,827,497 | 8/1974 | Dycus et al. | 252/8.55 X |
| 3,945,437 | 3/1976 | Chiu et al. | 252/8.55 X |
| 4,066,124 | 1/1978 | Carlin et al. | 166/275 X |
| 4,110,228 | 8/1978 | Tyler et al. | 252/8.55 |

Primary Examiner—Herbert B. Guynn

[57] ABSTRACT

Surfactant compositions comprising:

(1) an alkylated, diaromatic sulfonate,
(2) a petroleum sulfonate,
(3) a condensation product of an alkanol and an alkylene oxide, or a sulfate of such a condensation product, and
(4) a glycol ether are useful in enhanced oil recovery processes.

12 Claims, No Drawings

SURFACTANT COMPOSITIONS USEFUL IN ENHANCED OIL RECOVERY PROCESSES

CROSS-REFERENCE TO RELATED APPLICATION

This is a continuation-in-part of application Ser. No. 99,264 filed Dec. 3, 1979, now abandoned.

BACKGROUND OF THE INVENTION

This invention relates to surfactant compositions useful in enhanced oil recovery processes. In one aspect, the invention relates to surfactant compositions comprising a glycol ether while in another aspect, the invention relates to the use of the surfactant compositions in an aqueous flooding process for removing oil from a porous, subterranean rock reservoir.

Chiu et al., U.S. Pat. No. 3,945,437, teach multicomponent aqueous anionic surfactant systems consisting of an aromatic ether polysulfonate, a petroleum sulfonate, and alkoxy alcohol sulfates. The interfacial tension between these systems and oil is less than about 0.1 dyne per centimeter and the systems are taught to have good tolerance toward salts of mono- and/or multivalent cations found in the brine of many oil reservoirs. While these surfactant systems have demonstrated utility in the removal of oil from a porous, subterranean rock reservoir, their use toward this end is not without cost.

A significant factor in the cost of using aqueous anionic surfactant systems for the displacement of oil from a subterranean rock reservoir is loss of the surfactant system to the rock reservoir by adsorption, i.e., attachment of the active surfactant components to the reservoir surface. The extent of surfactant adsorption is primarily dependent upon the physical and chemical properties of the reservoir but given the relatively high cost of the surfactant systems, any decrease in the loss due to adsorption can be an economically significant factor in the production of oil from the reservoir.

SUMMARY OF THE INVENTION

According to this invention, surfactant adsorption by a porous, subterranean rock reservoir is significantly reduced by using a surfactant composition comprising:

(1) at least one alkylated diaromatic sulfonate,
(2) at least one petroleum sulfonate,
(3) at least one condensation product of a $C_2$-$C_3$ alkylene oxide and a $C_8$-$C_{16}$ alcohol or sulfate of such condensation product, and
(4) at least one glycol ether of the formula $$R-(OR')_n OH \qquad (I)$$

where R is a $C_1$-$C_6$ alkyl radical or a phenyl radical, R' is a $C_2$-$C_4$ alkylene radical and n is 1-5. The surfactant compositions of this invention demonstrate good tolerance to reservoir brine having both a high salinity and divalent ion content, e.g., $Ba^{++}$, $Mg^{++}$, $Sr^{++}$, $Ca^{++}$, etc., and the compositions demonstrate remarkably low, as compared to prior art surfactant compositions, adsorption onto the surface of the oil reservoir.

DETAILED DESCRIPTION OF THE INVENTION

Alkylated diaromatic sulfonates useful herein are of the general formula

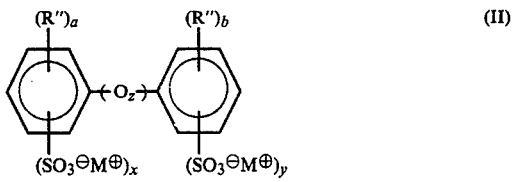

wherein each R'' is an alkyl radical and each R'' can be the same or different, each $M^{\oplus}$ is a hydrogen, alkali metal ion, alkaline earth metal ion or ammonium ion and each $M^{\oplus}$ can be the same or different, z is 0 or 1, a and b are individually 0 or 1 with the proviso that the $\Sigma(a+b)$ is at least 1, and x and y are individually 0 or 1 with the proviso that the average value of $\Sigma(x+y)$ for all (II) is at least about 1.7 and preferably at least about 1.8. R'' is preferably an alkyl radical of between 4 and about 18 carbon atoms, and more preferably of between about 10 and about 18 carbon atoms. The alkyl radicals of R can be linear, branched or cyclic but the linear and branched radicals are preferred. The $M^{\oplus}$ ammonium ion radicals are of the formula $$(R''')_3 HN^{\oplus} \qquad (III)$$

wherein R''' is a hydrogen, $C_1$-$C_4$ alkyl or $C_1$-$C_4$ hydroxyalkyl radical and each R''' can be the same or different. Illustrative $C_1$-$C_4$ alkyl and hydroxyalkyl radicals include: methyl, ethyl, propyl, isopropyl, butyl, hydroxymethyl, hydroxyethyl, etc. Typical ammonium ion radicals include: ammonium ($N^{\oplus}H_4$), methyl ammonium ($CH_3N^{\oplus}H_3$), ethyl ammonium ($C_2H_5N^{\oplus}H_3$), dimethyl ammonium (($CH_3)_2N^{\oplus}H_2$), methylethyl ammonium ($CH_3N^{\oplus}H_2C_2H_5$), trimethyl ammonium (($CH_3)_3N^{\oplus}H$), dimethylbutyl ammonium (($CH_3)_2N^{\oplus}HC_4H_9$), hydroxyethyl ammonium ($HOCH_2CH_2N^{\oplus}H_3$), methylhydroxyethyl ammonium ($CH_3N^{\oplus}H_2CH_2CH_2OH$), etc. $M^{\oplus}$ is preferably an alkali metal ion and more preferably an ion of sodium or potassium. When z is zero, the compound of formula (II) is an alkylated biphenyl derivative and when z is one, it is an alkylated diphenyl oxide derivative.

Surfactant compositions comprising sulfonates of formula II are known in the art. A series of such compositions where z is one are manufactured by The Dow Chemical Company under the trademark DOWFAX. Representative of these compositions are DOWFAX 2A1 surfactant (an 80:20 mixture, by weight, of disodium mono-($\Sigma(a+b)=1$) and di-($\Sigma(a+b)=2$) alkylated (each R'' is a branched $C_{12}$ alkyl radical) diphenylether disulfonate) and DOWFAX 3B2 surfactant (an 80:20 mixture, by weight, of disodium mono-($\Sigma(a+b)=1$) and di-($\Sigma(a+b)=2$) alkylated (each R'' is a linear $C_{10}$ alkyl radical) diphenylether disulfonate). Although the sulfonates of formula II can be used alone as the alkylated diphenyl oxide sulfonate component of the surfactant composition of this invention, preferably a combination of two sulfonates of formula II differing only in the number of R'' substituents (i.e., a combination of mono- and dialkylated sulfonates) are here used. The commercially available compositions of DOWFAX 2A1 and 3B2 surfactants are the preferred alkylated diphenyl oxide sulfonate component of this invention.

Sulfonates of formula (II) where z is zero may be produced from the corresponding alkylated diphenyl molecules by known sulfonation processes. For example, the compounds may be prepared by contacting an alkylated diphenyl with concentrated sulfuric acid in a hydrocarbon solvent or by contacting with sulfur trioxide dissolved in liquid sulfur dioxide as described in U.S. Pat. No. 4,172,029. The sulfonates of formula (II) may also be prepared by contacting the alkylated diphenyl precursors with boiling sulfur trioxide in inert organic solvents as described in U.S. Pat. No. 3,941,810. The alkylated diphenyl precursors can be prepared by reacting diphenyl with an olefin of desired chain length in the presence of a Friedel-Crafts catalyst, according to well-known processes of the art.

The petroleum sulfonates here used typically comprise mixtures of relatively water-soluble and water-insoluble alkali metal salts of such materials as alkylaryl sulfonates, alkylated benzene sulfonates, etc. The petroleum sulfonates available commercially from Mobil Oil Company (e.g., Promor® sulfonates) and Witco Chemical Company (e.g., Petronate® sulfonate salts and Pyronate® sulfonates) are typical. These petroleum sulfonates usually have a molecular weight average of at least about 400. Preferably, the petroleum sulfonates here used have a molecular weight average above about 350, more preferably above about 400 and preferably less than about 500, more preferably less than about 450.

The third component of the surfactant composition of this invention typically comprises a condensation product of a $C_8$–$C_{16}$ alkanol and a $C_2$–$C_3$ alkylene oxide or a sulfate of such condensation product. The alkanols can be either linear or branched but primary $C_{10}$–$C_{12}$ linear alkanols are preferred. Ethylene oxide is the preferred alkylene oxide. The alkanol and alkylene oxide are typically condensed into a product having an alkanol:oxide mole ratio between about 1:1 and about 1:10, preferably between about 1:1 and 1:5. Where the condensation product is made from combining the alkanol with a mixture of $C_2$ and $C_3$ alkylene oxides, the ethylene oxide is preferably present in a molar amount at least three times greater than the molar concentration of the $C_3$ alkylene oxide. The sulfates of the foregoing condensation products are typified by the same parameters and ratios as the condensation products themselves. Most preferred are sulfates of ethoxylated primary alcohols, exemplified by those manufactured and sold by Shell Chemical Company and Union Carbide under the trademarks NEODOL and TERGITOL, respectively.

The glycol ethers here used are of formula I

$$R\text{-}(OR')_n OH \qquad (I)$$

wherein R, R' and n are as previously defined. Preferably, R is a $C_1$–$C_4$ alkyl radical and R' is ethylene or 1,2-propylene. When n is greater than 1, each R' can be the same or different although typically they are the same. n is typically 1, 2 or 3 and preferably 1 or 2. Representative of the glycol ethers that can be used in the practice of this invention are a series of materials manufactured by The Dow Chemical Company under the trademark DOWANOL. Representative DOWANOL glycol ethers include: DOWANOL DB (diethylene glycol n-butylether), DOWANOL DE (diethylene glycol ethylether), DOWANOL DM (diethylene glycol methylether), DOWANOL DPM (dipropylene glycol methylether), DOWANOL EB (ethylene glycol n-butylether), DOWANOL EPh (ethylene glycol phenylether), DOWANOL PiBT (a mixture of isobutylethers of propylene glycol and its homologs), DOWANOL TPM (tripropylene glycol methylether), etc.

While each of the components that comprise the surfactant composition of this invention can be but a single material, each component, like the alkylated diaromatic sulfonate, can comprise a mixture of materials. In other words, the petroleum sulfonate component of this invention can comprise a mixture of two different petroleum sulfonates or the alkanol/alkylene oxide condensation product or corresponding sulfate component of this invention can comprise a mixture of one or more alkanols in combination with one or more alkylene oxides, or the glycol ether component of this invention can comprise a mixture of two or more glycol ethers. Moreover, the surfactant composition of this invention can comprise materials in addition to the four components previously described. Additional such components include various electrolytes, such as sodium and potassium chloride, and various water thickeners, such as carboxymethyl cellulose, hydroxyethyl cellulose, guar and guar derivatives and other polysaccharides, partially hydrolyzed polyacrylamide, etc. These additional components are not critical to the invention and can be used as desired.

The respective proportions of each component that comprises the surfactant composition of this invention will, as noted earlier, depend upon the properties of the reservoir or formation. Typically, the surfactant composition contains sufficient alkyl diaromatic sulfonate to provide good compatibility with the high salinity and divalent ion concentration of the reservoir brines, sufficient petroleum sulfonates to provide an interfacial tension between the surfactant composition and the oil no greater than 0.1, preferably 0.01, dyne per centimeter, sufficient alkanol/alkylene oxide condensation product or sulfate thereof to act as a solubility and water-wetting agent for the petroleum sulfonate and thus assist in reducing the interfacial tension between the water and the oil, and sufficient glycol ether to solubilize the other components such that the adsorption of the other components on the reservoir surface is significantly reduced. Reservoirs having relatively high porosity and small pore size make available a large surface area for adsorption and thus increase the possibility of entrapment of the surfactant molecules. In the presence of carbonates, such as dolomite, the possibility of surfactant adsorption is increased. Under such circumstances, relatively more glycol ether is required than under conditions where the reservoir or formation has a relatively low porosity, relatively large pore size and the presence of little or no carbonate. A typical surfactant composition comprises 100 parts by weight of an aqueous mixture of:

(1) about 0.005 to about 3.0, preferably about 0.30–1.50, parts alkylated diaromatic sulfonate, (2) about 0.1 to about 12, preferably about 0.30–3.0 parts, petroleum sulfonate, (3) about 0.01 to about 5, preferably about 0.25–2.5 parts, alkanol/alkylene oxide condensation product or sulfate thereof, (4) about 4.5 to about 13.5, preferably about 6.5–9 parts, glycol ether, and (5) the remaining parts water.

The surfactant compositions of this invention are used in the same manner as known surfactant compositions for displacing oil from a porous, subterranean rock reservoir. A slug of surfactant formulation, typically between about 4 and about 10 percent of the pore volume of the rock reservoir, is injected into the formation. The surfactant lowers the interfacial tension between the injected fluid and the reservoir oil to lower than about 0.1 dynes/cm, preferably to lower than about 0.01 dynes/cm. This low interfacial tension essentially eliminates the capillary forces and can result in essentially a 100 percent displacement efficiency in the sweep area of the reservoir. The surfactant slug is followed by a large slug of water containing a high molecular weight polymer This subsequent slug usually ranges in size from about 25 to about 75 percent of the pore volume of the reservoir. The polymer solution slug is used to develop a favorable mobility ratio displacement, to improve the sweep efficiency, and to preserve the integrity of the surfactant composition slug. The use of the surfactant composition of this invention substantially reduces the interfacial tension between the water and oil while reducing surfactant retention due to adsorption and entrapment. Moreover, these benefits are gained frequently at lower surfactant concentrations than required by the prior art. Still further, the surfactant compositions of this invention demonstrate excellent tolerance to mono- and polyvalent cations, such as the cations of calcium and magnesium, typically found in reservoir brine.

The following examples are illustrative of the specific embodiments of this invention. Unless indicated to the contrary, all parts and percentages are by weight.

SPECIFIC EMBODIMENTS

Example 1

Core samples of a fairly uniform sandstone were used in this experiment. The samples had an average pore entry radius of 5 microns, a porosity of 20 percent, an average permeability of 35 md (1 md–110 md range), a connate water saturation of 30 percent and a wettability index of 0.20 (i.e., slightly water-wet). The samples also contained about 8 percent dolomite as determined by acid solubility.

The cores were cleaned by carbon dioxide solvent extraction and then restored to their natural state. The cores were then flooded in the below-described procedure with the surfactants, injection water and isopropyl alcohol.

A cleaned core was saturated with formation water. The weight, bulk volume, pore volume and porosity were then determined. The core was placed in a Hassler sleeve and subjected to the following flow sequence:
(1) 10 pore volumes of surfactant composition,
(2) 22 pore volumes of injection water, and
(3) 4½ pore volumes of isopropyl alcohol (to desorb the surfactant).

Samples were collected, analyzed and a material balance was then made to account for all of the surfactant.

Two surfactant compositions were prepared. The first composition contained 100 parts of an aqueous mixture of by weight 0.47 percent of a 75-25 (weight ratio) blend of Witco TRS 10-80 (80 percent active) and condensation product A and 0.20 parts DOWFAX 2A1. Witco TRS 10-80 (marketed by Witco Chemical Company, Inc.) is an 80 percent active petroleum sulfonate with an average molecular weight of 405, condensation product A is a condensation product of one mole of a $C_{10}$–$C_{12}$ alcohol with 5 moles of ethylene oxide, and DOWFAX 2A1 surfactant (manufactured by The Dow Chemical Company) is an 80:20 mixture of sodium mono- and di-branched $C_{12}$ diphenylether disulfonates. The second composition contained by weight 91.9 parts of the first composition and 8.1 parts ethylene glycol monobutylether.

Analysis of the collected samples indicated that the first surfactant composition was absorbed on the core to the extent of approximately 17,790 pounds per acre-foot. The second composition, the composition of this invention, was absorbed to the extent of approximately 1,113 pounds per acre-foot. This marked reduction in absorption of surfactant greatly enhances the cost efficiency of a flooding process.

Example 2

The procedure of Example 1 was repeated except different core samples were employed and the components of the surfactant compositions were changed. The core samples had an average pore entry radius of 10 microns, a porosity of 18 percent, an average permeability of 100 md (10 md–350 md range), a connate water saturation of 31 percent and wettability index of 0.22. The first surfactant composition contained 11.5 parts of a 50:40:10 (weight ratio) blend of Witco TRS 18, Witco TRS 40 and condensation product A, and 2.1 parts DOWFAX 2A1 surfactant. Witco TRS 18 is a 62 percent active petroleum sulfonate with an average molecular weight of 495 and Witco TRS 40 is a 40 percent active petroleum sulfonate with an average molecular weight of 335, both marketed by Witco Chemical Company, Inc. Condensation product A and DOWFAX 2A1 surfactant are described in Example 1. The second composition contained by weight 91 parts of the first composition and 9 parts ethylene glycol monobutylether. Results of these experiments demonstrated that the first composition adsorbed onto the core sample at the rate of about 3,558 pounds per acre-foot while the second composition adsorbed at the rate of less than 7.5 percent of the first sample (about 266 pounds per acre-foot). Moreover, the salinity of the injection water was relatively high (approximately 6 percent) but both surfactant compositions showed good displacement of the reservoir oil.

Although the invention has been described in considerable detail by the above examples, this detail is for the purpose of illustration only and is not to be construed as a limitation upon the specification or appended claims.

What is claimed is:

1. An aqueous surfactant composition comprising:
   (1) at least one alkylated diaromatic sulfonate in an amount sufficient to impart good compatibility with subterranean reservoir brines,
   (2) at least one petroleum sulfonate in an amount sufficient to provide an interfacial tension of no greater than 0.1 dyne per centimeter between said aqueous composition and the oil of a subterranean reservoir,
   (3) at least one condensation product of a $C_8$–$C_{16}$ alkanol and a $C_2$–$C_3$ alkylene oxide as a solubilizing and wetting agent for said petroleum sulfonate, and
   (4) at least one glycol ether of the formula:

$$R(OR')_n\text{---}OH \qquad (I)$$

wherein R is a $C_1$–$C_6$ alkyl radical or a phenyl radical, R' is a $C_2$–$C_4$ alkylene radical, and n is 1–5 in an amount sufficient to reduce absorption of the other components of said composition on the surface of said reservoir, and wherein the alkylated diaromatic sulfonate is of the formula

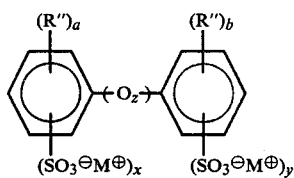

each R″ is an alkyl radical of between about 10 and about 18 carbon atoms, each M⊕ is a hydrogen, alkali metal ion, alkaline earth metal ion or ammonium ion, a and b are individually 0 or 1 with the proviso that the $\Sigma(a+b)$ is at least 1, x and y are individually 0 or 1 with the proviso that the average value of $\Sigma(x+y)$ for all (II) is at least about 1.7, and z is 0 or 1.

2. The composition of claim 1 wherein M⊕ is hydrogen or an alkali metal ion.

3. The composition of claim 2 wherein z is zero.

4. The composition of claim 2 wherein z is one.

5. The composition of claim 4 wherein the alkylated diaromatic sulfonate is an 80:20 mixture, by weight, of disodium mono- and dialkylated diphenyl ether disulfonate where R″ is a branched $C_{12}$ alkyl radical.

6. The composition of claim 5 wherein the petroleum sulfonate has a molecular weight average of at least about 400.

7. The composition of claim 6 wherein Component (3) is the condensation product of a primary $C_{10}-C_{12}$ linear alkanol and ethylene oxide, the product having an alkanol:oxide mole ratio between about 1:1 and about 1:10.

8. The composition of claim 7 where, in the glycol ether of formula (I), R is a $C_1-C_4$ alkyl radical, R′ is ethylene or 1,2 propylene, and n is 1 or 2.

9. The composition of claim 8 comprising 100 parts by weight of an aqueous mixture of:
(1) about 0.005 to about 3.0 parts alkylated diphenyl oxide sulfonate,
(2) about 0.1 to about 12 parts petroleum sulfonate,
(3) about 0.01 to about 5 parts condensation product,
(4) about 4.5 to about 13.5 parts glycol ether, and
(5) the remaining parts water.

10. The composition of claim 8 comprising 100 parts by weight of an aqueous mixture of:
(1) about 0.30 to about 1.50 parts alkylated diphenyl oxide sulfonate,
(2) about 0.30 to about 3.0 parts petroleum sulfonate,
(3) about 0.25 to about 2.5 parts condensation product,
(4) about 6.5 to about 9 parts glycol ether, and
(5) the remaining parts water.

11. The composition of claim 1 which further comprises a salt of at least one divalent ion selected from Ba(II), Mg(II), Sr(II) and Ca(II) ions.

12. A process for displacing oil from a porous, subterranean, rock reservoir, comprising injecting into the reservoir an active, aqueous anionic surfactant system comprising an alkylated diaromatic sulfonate, a petroleum sulfonate, and a condensation product of a $C_8-C_{16}$ alkanol and a $C_2-C_3$ alkylene oxide and a glycol ether of the formula

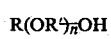

where R is a $C_1-C_6$ alkyl radical or a phenyl radical, R′ is a $C_2-C_4$ alkylene radical, and n is 1-5, wherein said active, aqueous anionic surfactant system is the composition described in claim 1, 2, 3, 4, 5, 6, 7, 8, 9 or 10.

* * * * *